May 7, 1940.  W. A. VAN BERKEL  2,199,943

SLICING MACHINE SLICE STACKING MECHANISM

Filed June 29, 1938

Wilhelmus Adrianus van Berkel INVENTOR
per ATTORNEY

Patented May 7, 1940

2,199,943

UNITED STATES PATENT OFFICE 2,199,943

SLICING-MACHINE SLICE-STACKING MECHANISM

Wilhelmus Adrianus van Berkel, Brussels, Belgium, assignor to U. S. Slicing Machine Company, La Porte, Ind.

Application June 29, 1938, Serial No. 216,414
In Great Britain July 16, 1937

9 Claims. (Cl. 146—94)

This invention relates to slice-stacking mechanism including a rotatable slice conveyer formed as an arcuate body, which may be completely circular or only part-circular, said mechanism being applicable to machines for slicing meat or other edible substances into slices in succession.

An object of the invention is to improve the means of operating the conveyer of slice-stacking mechanism in which the conveyer takes each slice when the conveyer is moving in unison with the slicing stroke of the carriage, and the conveyer returns with the slice to a slice-discharging position in unison with the return stroke of the carriage.

Another object of the invention is to provide, in combination with a slicing machine including the usual reciprocating carriage on which the substance to be sliced is positioned, slice-stacking mechanism the conveyer of which is operatively connected to a moving part of the machine other than the reciprocating carriage so as to receive from said part a to-and-fro rotational motion in timed relationship with the motion of the carriage.

Another object of the invention is to employ crank mechanism to drive the conveyer, it having been found that, by arranging such mechanism in proper phase relationship with the usual crank mechanism of the carriage drive, the conveyer can be operated in precise harmony with the carriage.

Another object of the invention is to improve the cam mechanism for operating the slice-discharging fly of the slice-stacking mechanism.

Other objects of the invention will be apparent from the following specification and claims.

An embodiment of the invention will now be described by way of example, with reference to the accompanying drawing, in which.

Figure 1:
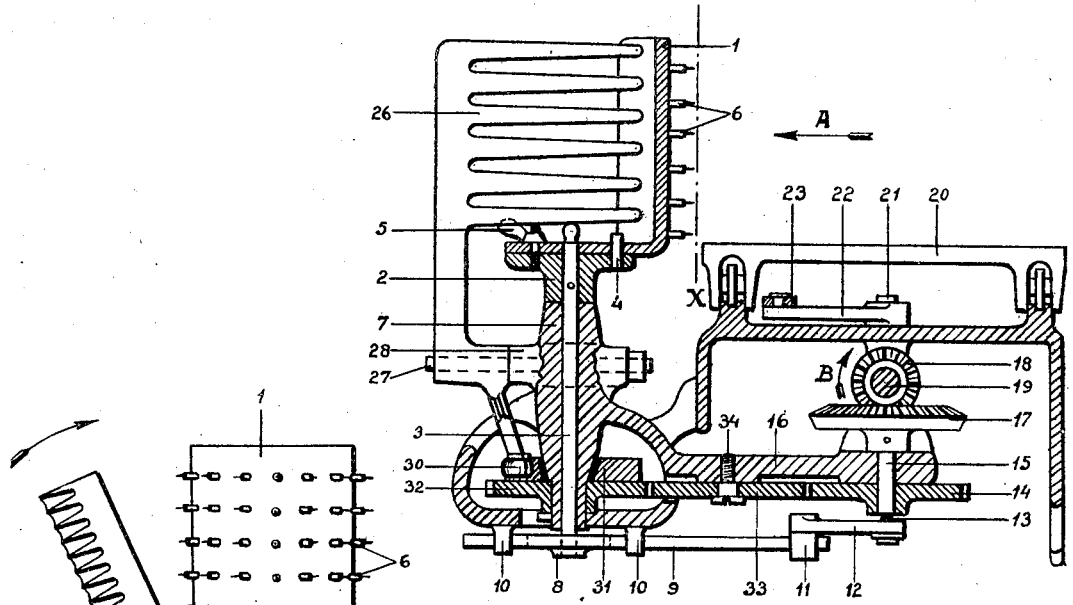
Fig. 1 is a sectional elevation of parts of a slicing machine showing the slice-stacking mechanism applied thereto.
Figure 3:
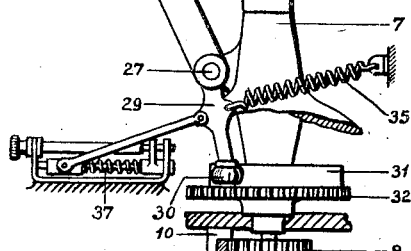
Fig. 3 is a fragmentary elevation in the direction of arrow A, Fig. 1.
Figure 2:
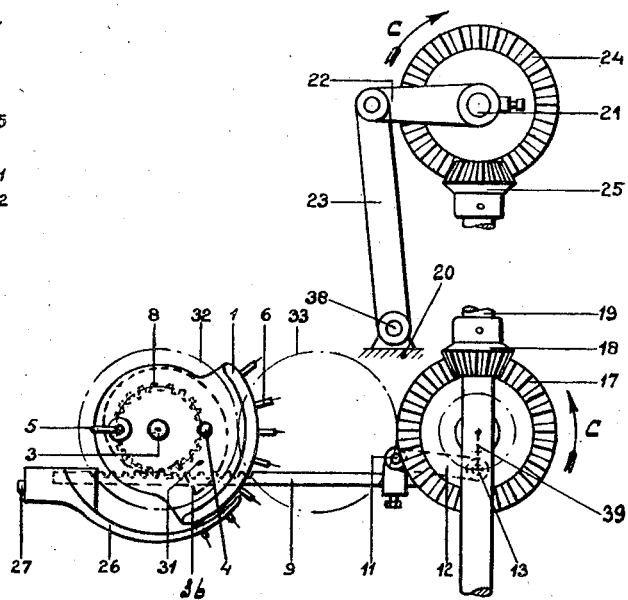
Fig. 2 is a fragmentary plan of parts included in Fig. 1, the base of the machine being omitted so as to show parts housed within it.

Referring firstly to Figs. 1 to 3, as therein shown the slice-stacking mechanism comprises an arcuate slice-conveyer 1 on a supporting flange 2 secured to the upper end of the conveyer shaft 3. The base of the conveyer is located on the flange 2 by a pin 4, the conveyer being held in its operative position by a locking device 5 which can be manipulated to allow removal of the conveyer for cleaning, inspection or repair. The usual slice-engaging prongs 6 are provided on the conveyer. The slicing plane in which acts the knife (not shown) of the machine is denoted by X—X in Fig. 1.

The conveyer shaft 3 is journalled in a bearing 7 provided by a bracket on the slicing machine frame and is driven by a pinion 8 which is secured to the foot of the shaft and meshes with a toothed rack 9. The rack is supported by guides 10 and is connected at 11 to a connecting-rod 12 which is connected to a crank-pin 13 on a crank disc combined with or constituted by a gear wheel 14. The central line of the crank is denoted by 39 in Fig. 2.

The gear wheel 14 is secured to the foot of a shaft 15 journalled in an extension 16 of the bracket including the bearing 7. A bevel wheel 17 at the top of shaft 15 meshes with a bevel pinion 18 on the main driving shaft, or flywheel shaft, 19 of the slicing machine.

The reciprocatory carriage 20 is driven as usual by a crank-shaft 21, a crank 22 and a connecting-rod 23, which latter is pivotally connected at 38 (Fig. 2) to the carriage 20. The shaft 21 is driven through bevel gear wheels 24, 25 by the main shaft 19.

The gear wheel 17 and pinion 18 have the same ratio as the gear wheels 24 and 25, so that the crank 14, 39 and crank 22 rotate at the same speed. It will be noted that in the position shown in Fig. 2 the angular setting of the crank pin 13, as indicated by the line 39, is spaced ninety degrees apart from the crank 22.

When the shaft 19 is driven (by means not shown, for example by the usual flywheel handle or by power means such as an electric motor) in the direction indicated by arrow B, Fig. 1, the gear wheel 14 and crank 22 are driven in the directions indicated by arrows C, Fig. 2. The rack oscillates the conveyer 1 in timed relationship with the reciprocations of the carriage, the conveyer taking the slice during the cutting stroke of the carriage and returning with the slice to the slice-discharging position during the return stroke of the carriage. The spacing of the cranks at ninety degrees, or thereabouts, facilitates the attainment of a well timed arrangement.

The crank-and-connecting-rod mechanism 21, 22 and 23 is as usual so arranged that the carriage 20 performs its slicing stroke (parallel to the plane X—X) at slow speed and has a quick return motion, this arrangement requiring the pivotal connection 38 to be offset (as shown in Fig. 2) for the stroke's central line through the axis of the crank-shaft 21. The crank-and-connecting-rod mechanism 12, 14 and 15 which drives the conveyer is correspondingly arranged, the pivotal connection 11 being offset from the central line of the mechanism; that is, a line drawn through the axis of the crank-shaft 15 parallel to the line of motion of the rack 9. By virtue of this arrangement, the conveyer also receives a quick return motion, and the arrangement can accordingly be such that precise harmony between the reciprocation of the carriage and the oscillation of the conveyer is maintained throughout the cycle of operations.

The usual slice-discharging fly 26 has a shaft 27 which is journalled in a bearing 28 provided on the same structure as the bearing 7, the shaft 27 having a stationary horizontal axis. The fly has a depending arm 29 with a roller 30 bearing against a cam 31 turnable in a horizontal plane coaxially of the conveyer. The cam 31 is secured to a gear wheel 32 which is freely rotatable on the foot of the bearing 7. This wheel 32 gears with the gear wheel 14 through an intermediate gear wheel 33 journalled on a stationary pin 34. The wheels 14 and 32 are of equal diameters so that the cam 31 is rotated always at the same speed and in the same direction as the wheel 14.

The roller 30 is urged against the cam by a tension spring 35. Each time the conveyer reaches its slice-discharging position, the roller simultaneously reaches the shoulder 36 of the cam, and the fly is forced outwards from the conveyer to discharge a slice from the prongs 6 upon a slice-receiving platform (not shown). The cam thereafter returns the fly to its upright slice-taking position.

The slice-discharging action of the fly takes place against the resistance of a known braking device 37 connected to the arm 29, the arrangement being such that the brake resistance progressively increases during the slice-discharging action.

In the drawing, the cam 31 is shown in the position which it occupies as it returns the discharge fly while the conveyer is about the mid-position of its slice-taking stroke, but the fly itself has been shown in its corresponding position only in Fig. 3, the fly having been shown in its upright position in Figs. 1 and 2 for clearness and simplicity of illustration. Moreover, for the same reasons, other parts have been shown in Fig. 1 displaced somewhat into positions in which they can best be seen, for example the cam roller 30.

Figure 4:
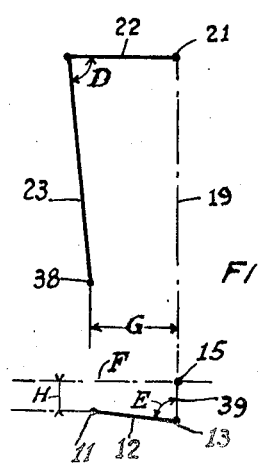
Fig. 4 is a diagrammatic representation of crank-and-connecting rod mechanisms positioned as shown in Fig. 2.

Referring to Fig. 4, the cranks 22 and 39, the connecting rods 23 and 12 and the flywheel shaft 19 are therein represented by their central lines. It will be clear from Fig. 4 that the mechanism 39, 12 is adapted to impart to the conveyer driving force at ninety degrees or thereabouts to the direction of the carriage's motion and that the arrangement of the conveyer's connecting-rod 12 is such that the varying angle E between it and its crank 39 remains the same as the varying angle D between the carrage's crank 22 and connecting rod 23.

It will also be clear from Fig. 4 that the force of the carriage connecting rod 23 is applied to the carriage at a pivot 38 which is laterally offset an amount G from the central line (namely, 19) through the axis of the carriage crank shaft 21 in the direction of the carriage's motion in order to give quick return motion and that the force of the conveyer connecting rod 12 is applied to the reciprocatory conveyer-driving member (9, Figs. 1 to 3) at a pivot 11 which is offset an amount H from the central line F through the axis of the conveyer crankshaft 15 in the direction of said member's motion. The amount H is so proportioned in relation to the amount G that the conveyer receives a quick return motion approximately harmonising with that of the carriage.

The construction shown has been given by way of example for the purposes of illustration, but it is to be understood that modifications could be made without departing from the scope of the invention. For example, a toothed sector could be provided instead of the straight rack 9. Although, for simplicity, the spring for urging the roller against the cam has been shown as a tension spring, if desired for compactness a torsion spring may instead be provided on the fly shaft 27.

By arranging the cam 31 to rotate coaxially of the conveyer in a horizontal plane a very compact arrangement can be obtained, but nevertheless any other suitable cam arrangement could be adopted.

In the drawing, the usual substance-holding feed-table with which a slicing-machine reciprocating carriage is usually equipped has not been shown, nor has the usual feed-mechanism.

I claim:

1. In combination with a slicing machine having a substance-supporting carriage and mechanism for reciprocating said carriage including crank-and-connecting-rod mechanism of which the connecting-rod has an offset connection to said carriage to give quick-return operation, slice-stacking mechanism including a slice-conveyer mounted for rotation adjacent said carriage gearing to rotate said conveyer to-and-fro, and additional crank-and-connecting-rod mechanism of which the crank is driven at the same speed as said carriage-reciprocating crank and of which the connecting-rod has an offset connection with said gearing to give quick-return operation of the conveyer in overall harmony with said carriage.

2. In combination with a slicing machine having a substance-supporting carriage and mechanism for reciprocating said carriage including a rotatable carriage-driving crank, slice-stacking mechanism comprising a slice-conveyer mounted for rotation adjacent said carriage, a rotatably mounted conveyer-driving crank rotated by said machine, mechanism including rack-and-pinion gearing connecting said conveyer-driving crank to said conveyer to drive said conveyer rotationally to-and-fro in timed relationship with said carriage, a slice-discharging fly co-operating with said conveyer, a cam arranged coaxially in relation to said conveyer for actuating said fly, and means for rotating said cam unidirectionally in timed relationship with the to-and-fro motion of the conveyer.

3. Slicing-machine slice-stacking mechanism comprising an arcuate slice-conveying body mounted in a stationary location to rotate about a vertical axis, crank-and-connecting rod mechanism for imparting to said body a to-and-fro rotational motion about said axis, a slice-discharging fly pivotable about a stationary horizontal axis and arranged to co-operate with said conveyer, a cam actuating said fly and rotatable about the conveyer axis, and means for rotating said cam unidirectionally in timed relationship with said carriage.

4. In combination with a slicing machine having a substance-supporting carriage and mechanism for reciprocating said carriage including a rotatable driving shaft in operative association with a rotatable crank, slice-stacking mechanism comprising an arcuate slice-conveying body mounted for rotation about a vertical axis adjacent said carriage, another rotatable crank rotated by said shaft, motion-transmitting means connecting said other crank to said conveying body to drive said body rotationally to-and-fro in timed relationship with said carriage, a slice-discharging fly pivotable about a horizontal stationary axis and arranged to co-operate with said conveyer, a cam rotatable about the conveyer axis for actuating said fly and gearing interconnecting said driving shaft and said cam to drive the cam unidirectionally.

5. In combination with a slicing machine having a substance-supporting carriage and mechanism for reciprocating said carriage comprising a rotatable driving shaft and crank-and-connecting-rod gear, slice-stacking mechanism including a slice conveyer journalled for rotation adjacent said carriage, a rotatable crank rotated by said driving shaft, a conveyer-driving connecting-rod reciprocated by said crank and gearing interconnecting said connecting-rod and said conveyer to drive said conveyer rotationally to-and-fro in timed relationship with said carriage, the conveyer-driving connecting-rod being so arranged that the varying angle between it and its crank is always the same as the angle between the carriage-reciprocating connecting rod and crank.

6. In combination with a slicing machine having a substance-supporting carriage and mechanism for reciprocating said carriage including a rotatable driving shaft in operative association with a rotatable crank and a carriage-reciprocating connecting-rod between said carriage and said crank, slice-stacking mechanism comprising a slice conveyer mounted for rotation adjacent said carriage, another rotatable crank rotated by said shaft, a conveyer-driving connecting-rod connected to said other crank, gearing interposed between said conveyer connecting-rod and said conveyer to drive said conveyer rotationally to-and-fro in timed relationship with said carriage, a pivotable slice-discharging fly arranged to co-operate with said conveyer, a cam mounted in association with the conveyer for actuating said fly and means interconnecting said driving shaft and said cam to drive the cam unidirectionally, the conveyer-driving connecting-rod being so arranged that the varying angle between it and its crank is always the same as the angle between the carriage-reciprocating connecting rod and crank.

7. In combination with a slicing machine having a substance-supporting carriage and mechanism for reciprocating said carriage, which mechanism comprises a carriage-reciprocating crank and connecting-rod, slice-stacking mechanism including a slice conveyer which is journalled for rotation adjacent said carriage, a rotatably mounted conveyer-driving crank rotated by said machine, a conveyer-driving connecting-rod reciprocated by said last-mentioned crank, a toothed member attached to said conveyer-driving connecting-rod and mounted for reciprocation thereby and another toothed member attached to said conveyer and arranged in mesh with the first toothed member, the conveyer-driving connecting-rod being so arranged that the varying angle between it and its crank is always the same as the angle between the carriage-reciprocating connecting rod and crank.

8. Slice-stacking mechanism as claimed in claim 7 in which the toothed member attached to the conveyer-driving connecting-rod is mounted to reciprocate endwise at about ninety degrees to the direction in which the carriage reciprocates and in which the conveyer-driving crank is spaced about ninety degrees from the carriage-reciprocating crank whenever the latter is at ninety degrees to said direction.

9. In combination with a slicing machine having a substance-supporting carriage and mechanism for reciprocating said carriage, which mechanism includes a rotatable carriage-reciprocating crank, slice-stacking mechanism including a slice conveyer which is journalled for rotation adjacent said carriage, a conveyer-driving crank rotated by said machine at the same speed as said first-mentioned crank, a connecting-rod reciprocated by said conveyer-driving crank, a toothed member attached to said connecting-rod and mounted for reciprocation thereby at about ninety degrees to the direction in which the carriage reciprocates, and another toothed member attached to said conveyer and arranged in mesh with the first toothed member, said conveyer-driving crank being spaced about ninety degrees from the carriage-reciprocating crank whenever the latter is at ninety degrees to said direction.

WILHELMUS ADRIANUS van BERKEL.